US00RE35126E

United States Patent [19]

Agari

[11] E Patent Number: Re. 35,126

[45] Reissued Date of Patent: Dec. 19, 1995

[54] LINEAR MOTION ROLLING CONTACT GUIDE UNIT USING A ROD RAIL

[75] Inventor: Norimasa Agari, Seki, Japan

[73] Assignee: Nippon Thompson Co., Ltd., Tokyo, Japan

[21] Appl. No.: 289,359

[22] Filed: Aug. 11, 1994

Related U.S. Patent Documents

Reissue of:

[64] Patent No.: 5,294,201
Issued: Mar. 15, 1994
Appl. No.: 939,175
Filed: Sep. 2, 1992

[30] Foreign Application Priority Data

Feb. 9, 1991 [JP] Japan ..... 3-246491

[51] Int. Cl.[6] ..... F16C 29/06

[52] U.S. Cl. ..... 384/45; 384/25

[58] Field of Search ..... 384/25, 43–45, 384/49

[56] References Cited

U.S. PATENT DOCUMENTS

| | | | |
|---|---|---|---|
| 3,897,982 | 8/1975 | Teramacki | 384/45 |
| 4,789,249 | 12/1988 | Mutolo | 384/43 |
| 4,815,862 | 3/1989 | Mugglestone et al. | 384/43 |
| 4,952,075 | 8/1990 | Rogers, III | 384/43 |
| 4,974,969 | 12/1990 | Jacob | 384/43 |
| 5,044,779 | 9/1991 | Albert et al. | 384/43 X |

FOREIGN PATENT DOCUMENTS

| | | | |
|---|---|---|---|
| 3931351 | 3/1991 | Germany | 384/45 |
| 152720 | 6/1988 | Japan | 384/49 |

*Primary Examiner*—Thomas R. Hannon
*Attorney, Agent, or Firm*—Skjerven, Morrill, MacPherson, Franklin, & Friel

[57] ABSTRACT

A linear motion rolling contact guide unit having a rod rail having a substantially circular cross section is provided. The guide unit also includes a slider slidably mounted on the rod rail and a plurality of rolling members interposed between the rod rail and the slider to thereby provide a rolling contact therebetween. The slider is so structured that it surrounds only a part the circumference of the rod rail and thus the slider has a generally U-shaped cross sectional shape. Since the rod rail is not surrounded completely, it may be placed in a V-shaped groove of a bed substantially over its entire stroke.

7 Claims, 5 Drawing Sheets

LINEAR MOTION ROLLING CONTACT GUIDE UNIT USING A ROD RAIL

Matter enclosed in heavy brackets [ ] appears in the original patent but forms no part of this reissue specification; matter printed in italics indicates the additions made by reissue.

BACKGROUND OF THE INVENTION

1. Field of the Invention

This invention generally relates to a linear motion rolling contact guide unit, and, in particular, to a small-sized linear motion rolling contact guide unit using a rod rail suitable for use in precision measuring apparatuses and semiconductor facilities.

2. Description of the Prior Art

A linear motion rolling contact guide unit using a rod rail is well known in the art as disclosed, for example, in the Japanese Patent Lain-open Pub. No. 63-152719. The structure of the guide unit disclosed in this publication is illustrated here in FIGS. 4 through 7.

As shown in FIGS. 4 through 7, a linear motion rolling contact guide unit generally includes a rail 31 extending over a desired length, a slider 32 slidably mounted on the rail and a plurality of rolling members 33 interposed between the rail and the slider. The guide unit shown in FIGS. 4 through 7 has a characteristic feature in that its rail 31 is in the shape of a rod having a substantially circular cross section. In the illustrated example, the rod rail 31 is formed with a pair of upper and lower inner guide grooves 31a on each side thereof. As a result, the rod rail 31 is formed with four inner guide grooves 31a in total, each extending in parallel with the longitudinal axis of the rod rail 31.

The slider 32 generally includes a hollow cylindrical section through which the rod rail 31 extends and a flat mounting section, which is generally rectangular in shape and provided with a plurality (four in the illustrated example) of threaded mounting holes 32a one at each corner. Four endless circulating paths are provided in the hollow cylindrical section of the slider 32 and each of the endless circulating paths includes a load path section, a return path section and a pair of curved connecting path sections, each connecting the corresponding ends of the load and return path sections as well known in the art. An outer guide groove is formed in the inner peripheral surface of the hollow cylindrical section located opposite to its associated outer guide groove 31a as best shown in FIG. 6 so that the load section of each endless circulating path is defined by a pair of oppositely arranged inner and outer guide grooves. A plurality of rolling members or balls 33 in the illustrated example are provided in each of the endless circulating paths as best shown by the dotted lines in FIG. 5 so that the balls 33 roll along each of the endless circulating paths as the slider 32 moves along the rod rail 31, whereby those balls 33 which are located in the load path sections provide a rolling contact between the slider 32 and the rod rail 31.

Such a guide unit is typically mounted on a bed 34, for example, of a precision measuring apparatus or the like as shown in FIG. 7. Typically, two or more pairs of such guide units are provided and arranged in parallel to each other on the bed 34 or the like. The rod rail 31 is formed with a plurality of mounting holes 31b extending transversely across the rod rail 31, and the rod rail 31 is fixedly mounted on the bed 34 by means of bolts 35. For example, the bed 34 is provided with a block 36 having a raised end section formed with a V-shaped groove 36a for receiving therein an end portion of the rod rail 31. Since the slider 32 has a hollow cylindrical section which is loosely fitted onto the rod rail 31, the rod rail 31 must be located away or above the mounting block 36 so as to provide a continuous gap between the rod rail 31 and the mounting block 36. For this purpose, the mounting block 36 must have a raised section at each end.

As best shown in FIG. 7, since the flat mounting section of the slider 32 is formed with a plurality of threaded mounting holes 32a, the flat mounting section of the slider 32 may be fixedly attached to a sliding table 37 by means of bolts 38. The table 37 may be fixedly attached to two or more sliders 32 of other guide units which are arranged in parallel to each other. Any desired object, such as cutting tools or a work piece to be machined, may be mounted on the table 37 and the table 37 may be driven to move in any direction as indicated by a double arrow A.

Such a guide unit using a rod rail is particularly advantageous since it is simple in structure and thus easy and less expensive to manufacture. For example, the rod rail 31 is simple in structure and easy to fabricate. In addition, the rod rail 31 can be made smaller in size since its rigidity is relatively high. In additions, the slider 32 is also relatively simple in structure and thus easy to manufacture.

However, in the prior art guide unit using a rod rail as shown in FIGS. 4 through 7, since the slider 32 includes a hollow cylindrical section which completely surrounds the rod rail 31, difficulty may still be encountered in fabricating, in particular in molding and machining, the slider 32. In addition, because of such a completely surrounding structure, a continuous gap 36b between the rod rail 31 and the mounting block 36 must be provided along the entire stroke of the slider 32. As a result, there is a limit in locating the rod rail 31 closer to the mounting block 36, which, in turn, impairs the effort in making the overall size of the guide unit even smaller. Furthermore, since the rod rail 31 must be supported at its opposite ends only, the rod rail 31 may bend undesirably if the rod rail 31 is too long and/or too small in diameter. Thus, there is also a limit in making the overall size of the guide units smaller or larger.

SUMMARY OF THE INVENTION

In accordance with the present invention, there is provided a linear motion rolling contact guide unit which generally includes a rod rail having a substantially circular cross section and at least one inner guide groove extending in parallel with a longitudinal axis of the rail, a slider slidably mounted on said rod rail extending only a part of a circumference of said rod rail and having at least one guide groove extending in parallel with and in an opposed relationship with said inner guide groove to thereby define a guide channel, and a plurality of rolling members provided in said guide channel to thereby provide a rolling contact between said rod rail and said slider.

Preferably, the rod rail is formed with a pair of inner guide grooves located substantially on opposite sides thereof and the slider is also formed with a pair of outer guide grooves each of which is associated with one of the pair of inner guide grooves to thereby define the guide channel. In one embodiment, the slider is provided with at least one endless circulating path including a load path section, a return path section and a pair of curved connecting path sections, each connecting the corresponding ends of the load and return path sections. In this instance, the load path section substantially corresponds to the guide channel set forth above.

It is therefore a primary object of the present invention to provide an improved linear motion rolling contact guide unit.

Another object of the present invention is to provide an improved linear motion rolling contact guide unit having a rod rail.

A further object of the present invention is to provide an improved linear motion guide unit compact in size, simple and yet sturdy in structure and easy and inexpensive to manufacture.

A further object of the present invention is to provide an improved linear motion guide unit having an increased degree of freedom in designing and mounting.

Other objects, advantages and novel features of the present invention will become apparent from the following detailed description of the invention when considered in conjunction with the accompanying drawings.

DESCRIPTION OF THE PREFERRED EMBODIMENTS

Figure 1:
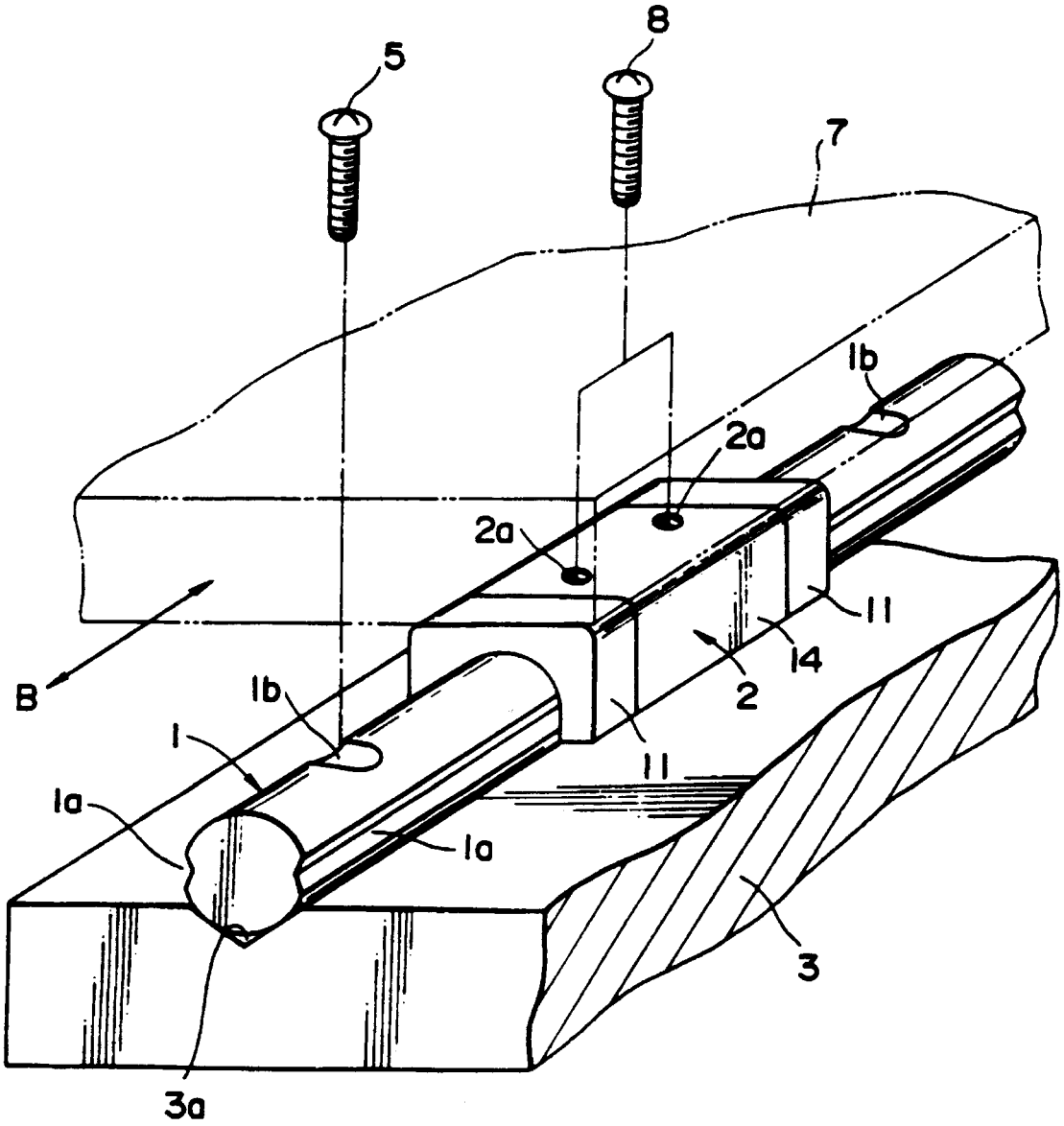
FIG. 1 is a schematic illustration showing in partly exploded, perspective view a linear motion rolling contact guide unit constructed in accordance with one embodiment of the present invention.
Figure 2:
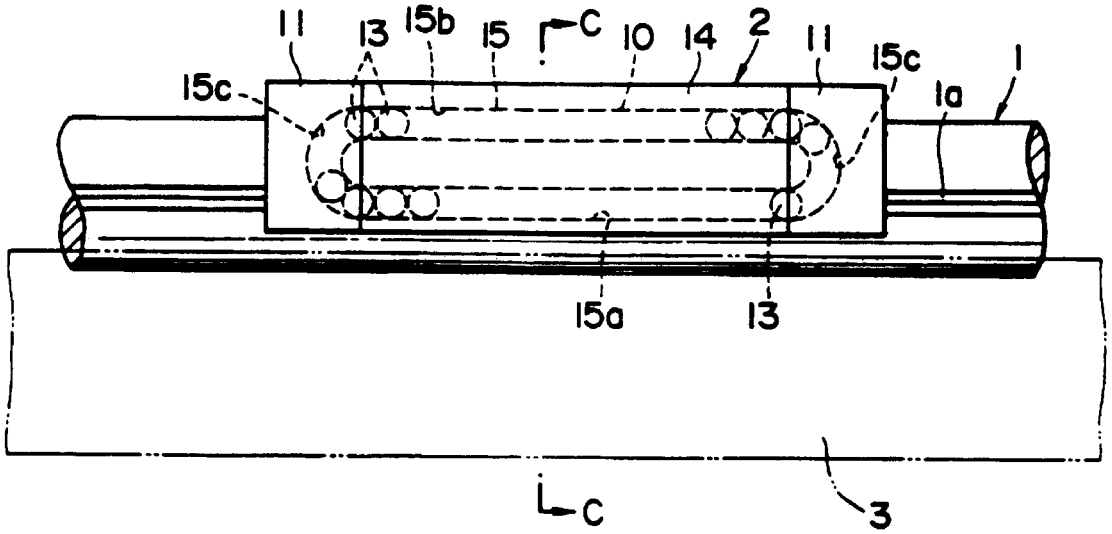
FIG. 2 is a schematic illustration showing in side elevation the guide unit of FIG. 1.
Figure 3:
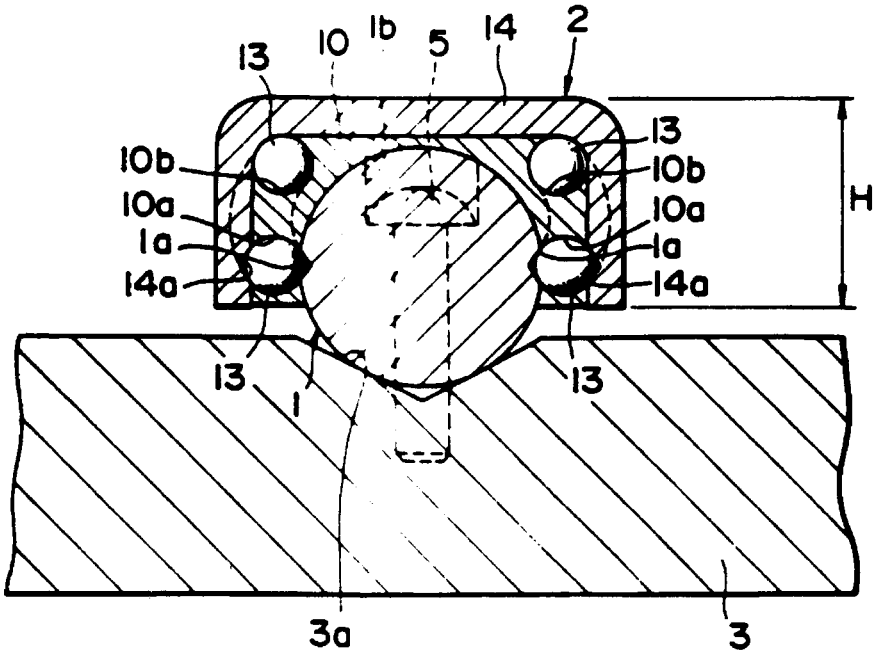
FIG. 3 is a schematic illustration showing in transverse cross section the guide unit of FIG. 1 taken along line C—C indicated in FIG. 2.
Figure 4:
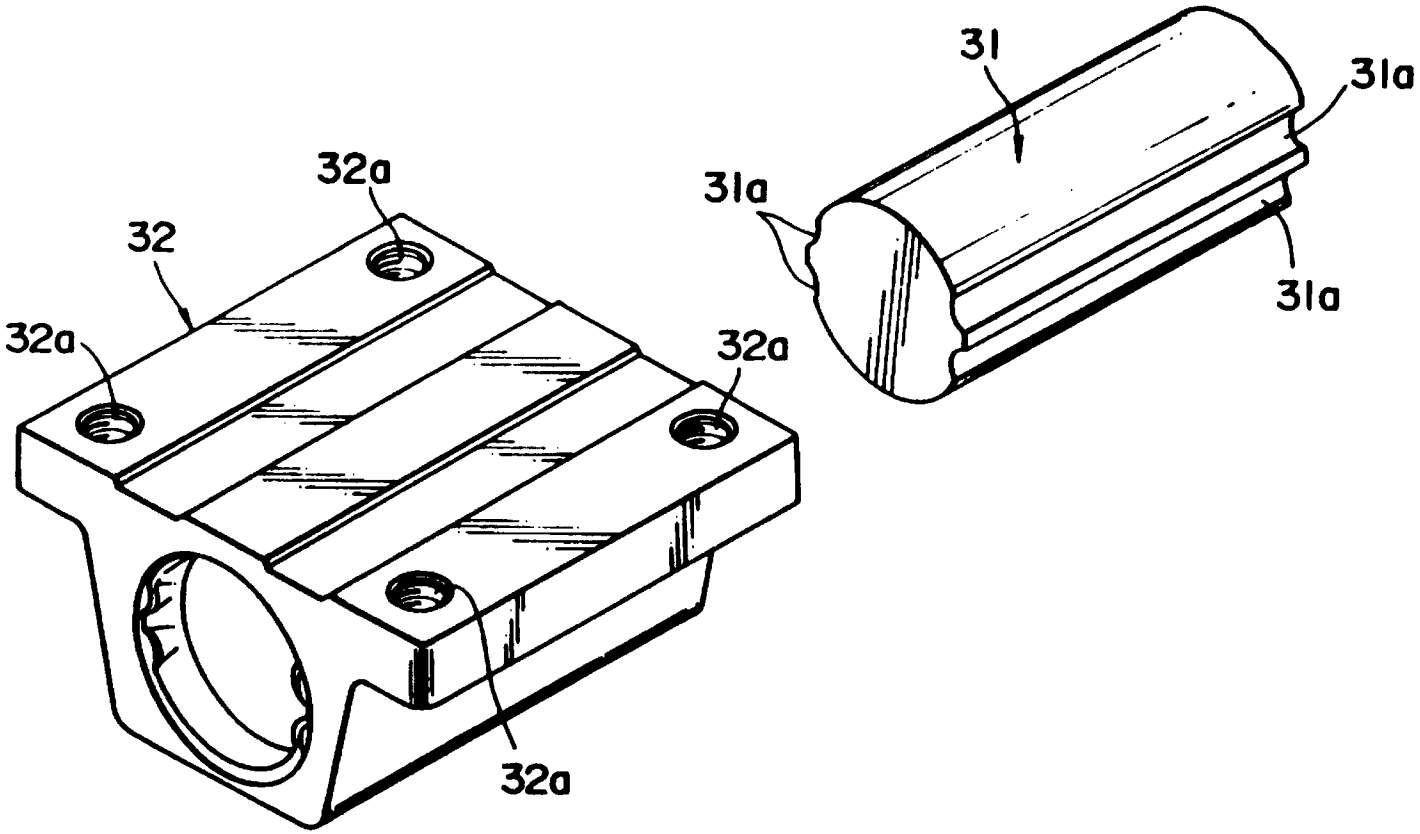
Fig. 4 Prior Art
FIG. 4 is a schematic illustration showing in exploded, perspective view a typical prior art linear motion rolling contact guide unit using a rod rail.
Figure 5:
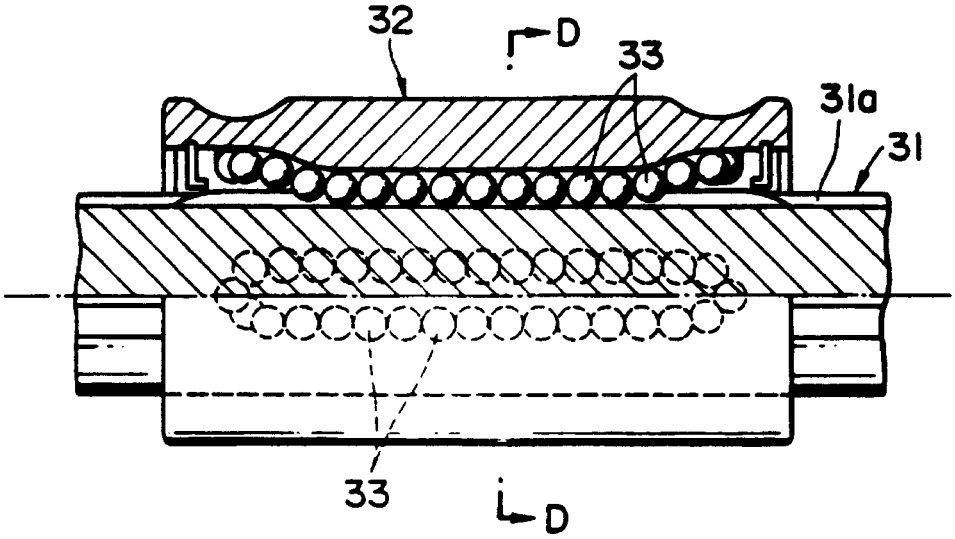
Fig. 5 Prior Art
FIG. 5 is a schematic illustration showing in side elevation with its upper half in longitudinal cross section the guide unit of FIG. 4.
Figure 6:
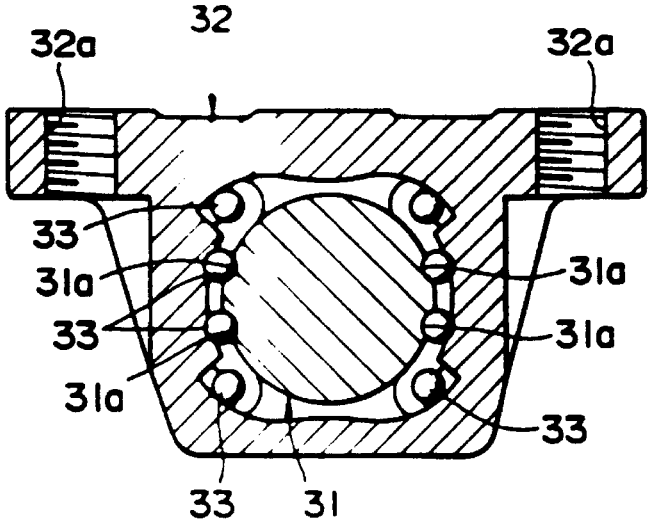
Fig. 6 Prior Art
FIG. 6 is a schematic illustration showing in transverse cross section the guide unit of FIG. 4 taken along line D—D indicated in FIG. 5.
Figure 7:
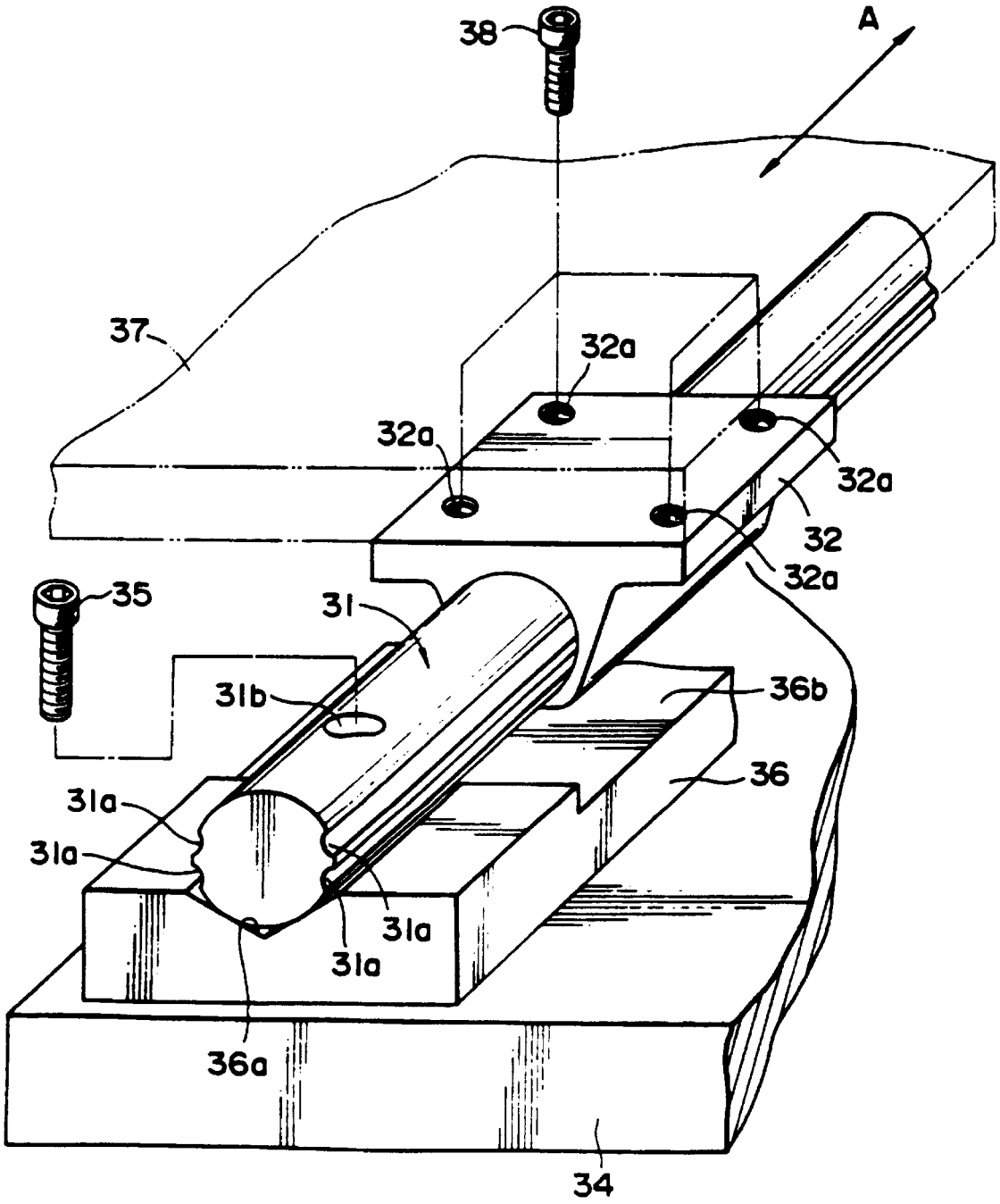
Fig. 7 Prior Art
FIG. 7 is a schematic illustration showing in partly exploded, perspective view the prior art guide unit of FIG. 4 when mounted on the bed of a precision measuring apparatus.

Referring now to FIGS. 1 through 3, there is schematically shown a linear motion rolling contact guide unit constructed in accordance with one embodiment of the present invention. As shown, the present linear motion guide unit generally includes a rod rail 1, a slider 2 and a plurality of rolling members or balls 13 interposed between the rod rail 1 and the slider 2.

In the present guide unit, the rod rail 1 has a substantially circular cross section and extends straight over a desired length. Typically, the rod rail 1 has a diameter of equal to or less than 30 mm, but the rod rail 1 may have a larger diameter, if desired. The rod rail 1 is formed with a pair of inner guide grooves 1a on its opposite sides, each extending in parallel with the longitudinal axis of the rod rail 1. Preferably, the pair of inner guide grooves 1a are located substantially in a diametrically opposite relationship.

In the structure shown in FIG. 1, the rod rail 1 is fixedly mounted on a bed 3, for example, of a precision measuring apparatus as partly received in a V-shaped groove 3a formed at the top surface of the bed 3. Although only one such rod rail 1 is shown in FIG. 1, two or more such rod rails 1 may be mounted on the bed 3 as arranged in parallel to each other. The rod rail 1 is formed with a plurality of transverse through-holes 1b, through which screws or bolts 5 may extend to have the rod rail 1 fixedly attached to the bed 3.

It is to be noted that in the structure shown in FIG. 3, the rod rail 1 is partly received in the V-shaped groove 3a almost along its entire length. As will be described more in detail later, such a contact between the rod rail 1 and the V-shaped groove 3a is possible because the slider 2 does not completely surround the rod rail 1 unlike the prior art guide unit described before. Such a structure is particularly important since it allows to prevent the rod rail 1 from being bent undesirably so that the rod rail 1 may have any desired diameter no matter how small it may be. Although the rod rail 1 is in contact with the V-shaped groove 3a substantially along its entire length in the illustrated embodiment, it should be noted that the rod rail may be supported at a plurality of spaced apart locations along its longitudinal axis in place of a continuous contact between the rod rail 1 and the V-shaped groove 3a.

As shown in FIG. 1, the slider is formed with a plurality (two in the illustrated embodiment) of mounting holes 2a at the top surface thereof so that the slider 2 may be fixedly attached to a sliding table 7, for example, by means of screws or bolts 8, to which another or more sliders 2 may also be fixedly attached. The table 7 may be used as a carrier for carrying thereon a cutting tool or a work piece to be processed.

The slider 2 in the illustrated embodiment has a generally U-shaped cross section in the transverse direction and thus the slider 2 is slidably mounted on the rod rail 1 in a straddling manner. As a result, in the present guide unit, the slider 2 only partly surrounds the rod rail 1 and not completely around the rod rail 1 as in the prior art guide unit shown in FIGS. 4 through 7. Since the slider 2 of the present invention is generally trough-shaped and thus has an open structure which allows an easy access to its outer guide grooves. Therefore, the slider 2 of the present invention can be fabricated with ease and at high accuracy. Besides, since the slider 2 only partly surrounds the rod rail 1, its height H indicated in FIG. 3 may be minimized, which in turn contributes to make the overall size of the guide unit as small as possible. In addition, there is no need to provide a continuous gap 36b in the present invention unlike the prior art guide unit as described before. This allows to make the present guide unit even smaller in size and significantly sturdy in structure.

In the specific embodiment shown in FIGS. 1 through 3, the slider 2 has a three part structure, including a center block, comprised of an inner sliding member 10 and an outer cover member 14, and a pair of end blocks 11 located at each end of the center block. The inner sliding member 10 is preferably comprised of a resin material and each of the pair of end blocks 11 is also preferably comprised of a resin material. The outer cover member 14 is preferably comprised of a metal.

In the present embodiment, the slider 2 is provided with a pair of endless circulating paths 15, each including a load path section 15a, a return path section 15b and a pair of curved connecting path sections 15c, each connecting the corresponding ends of the load and return path sections. As best shown in FIG. 3, the load path section **15*a* of the endless circulating path is defined by a pair of opposed inner and outer guide grooves 1aand 14a and also by a lower passage 10a formed in the inner sliding member 10. Those balls 13 that are located in the load path section 15a are partly received in each of the inner and outer guide grooves 1a and 14a to thereby provide a rolling contact between the rod rail 1 and the slider 2. Thus, the passage 10a formed in the inner sliding member 10 may be a simple clearance passage which does not hinder the rolling motion of the balls 13 along the load path section 15a. On the other hand, the return path section 15b is defined by an upper passage 10b provided at each upper corner of the inner sliding member 10 extending in parallel with the lower passage 10a as best shown in FIG. 3 and also by an inner corner of the U-shaped outer cover member 14. Thus, the return path section 15b is defined when the outer cover member 14 and the inner sliding member 10** are assembled together, for example, by an adhesive or bolts.

The load and return path sections 15a and 15b are provided in the center block of the slider 2 as best seen in FIG. 2. On the other hand, in the present embodiment, each of the pair of curved connecting path sections 15c is provided in each of the end blocks 11. Thus, the endless circulating path is properly defined when the center and end blocks are assembled together. Any fixing means, such as an adhesive or bolts, may be used to have the center and end blocks fixedly attached together as well known in the art.

Since the inner sliding member 10 is comprised of a resin, it may be set to be in sliding contact with the rod rail 1. In this case, however, the resin of the inner sliding member 10 should have an excellent sliding characteristic relative to the rod rail 1. Otherwise, a lubricating scheme may be required. On the other hand, the inner sliding member 10 may be so set to be separated away from the surface of the rod rail 1, if desired. For example, the slider 2 may be slidably mounted on the rod rail 1 at its lower half or in an upside down structure from that shown in FIG. 3.

The cover member 14 is preferably comprised of a metal since it is normally provided with a plurality of threaded mounting holes 2a as shown in FIG. 1 for fixedly attaching the slider 2 to a desired object, such as a sliding table 7 by means of bolts or screws 8. Thus, the table 7 may move reciprocatingly in either direction along the rod guide 1 as indicated by a double arrow B in FIG. 1. The table 7 may be so structured to carry thereon a cutting tool or a work piece to be machined.

As described above, in accordance with the present invention, since use is made of a rod rail having a substantially circular cross section, it is extremely easy to manufacture the rail. Moreover, the size of the rail may be made the smallest for a required level of strength. In addition, in accordance with the present invention, since the slider is so structured to surround only a part of the circumference of the rod rail, the slider may be made with ease and at high accuracy because of its increased accessibility. Furthermore, since the rod rail in only partly surrounded by the slider, there is an increased freedom in mounting the rod rail and the overall size of the guide unit can be made significantly smaller than the prior art structure without deteriorating its mechanical strength.

While the above provides a full and complete disclosure of the preferred embodiments of the present invention, various modifications, alternate constructions and equivalents may be employed without departing from the true spirit and scope of the invention. For example, although the present invention has been described with respect to a linear motion guide unit having an endless circulating path, the present invention is equally applicable to a linear motion guide unit of the finite stroke type. In addition, the present invention is also applicable to other types of rolling members, such as rollers. Therefore, the above description and illustration should not be construed as limiting the scope of the invention, which is defined by the appended claims.

What is claimed is:

1. A linear motion rolling contact guide unit, comprising:

a rod rail having a substantially circular cross section and a pair of inner guide grooves extending in parallel with a longitudinal axis of the rail and formed in a peripheral surface of said rod rail, one of said grooves located substantially diametrically opposite the other of said grooves in a substantially horizontal orientation;

a slider slidably mounted on said rod rail extending around only a part of a circumference of said rod rail and having a pair of guide grooves, each extending in parallel with and in an opposed relationship with a corresponding one of said inner guide grooves to thereby define a pair of guide channels, said slider including an inner sliding member substantially in sliding contact with a top half of the peripheral surface of said rod rail and an outer cover member covering said inner sliding member; and a plurality of rolling members provided in each of said guide channels to thereby provide a rolling contact between said rod rail and said slider.

2. The guide unit of claim 1, wherein said slider includes at least one endless rolling members circulating path defined by a load path section, a return path section and a pair of curved connecting path sections, each connecting the corresponding ends of said load and return path sections.

3. The guide unit of claim 2, wherein said slider includes a center block, in which said load and return path sections are provided, and a pair of end blocks fixedly attached to each end of said center block and each provided with said curved connecting path sections.

4. The guide unit of claim 3, wherein said center block includes said inner sliding member comprised of a resin material and said outer cover member comprised of a metal.

5. The guide unit of claim 4, wherein each of said pair of end blocks is comprised of a resin material.

6. The guide unit of claim 1, further comprising a base formed with a V-shaped groove at its top surface for receiving therein said rod rail at least partly.

7. The guide unit of claim 6, wherein said rod rail is provided with a plurality of transverse through-holes through which mounting bolts may extend to have said rod rail fixedly attached to said base.

* * * * *

UNITED STATES PATENT AND TRADEMARK OFFICE

CERTIFICATE OF CORRECTION

PATENT NO. : Re. 35,126

DATED : December 19, 1995

INVENTOR(S) : Norimasa Agari

It is certified that error appears in the above-indentified patent and that said Letters Patent is hereby corrected as shown below:

Title page, item [30], under Foreign Application Priority Data, delete--"Feb. 9, 1991" and insert --Sept. 2, 1991--.

Signed and Sealed this

Twenty-seventh Day of August, 1996

*Attest:*

Bruce Lehman

BRUCE LEHMAN

*Attesting Officer*

*Commissioner of Patents and Trademarks*